United States Patent
Sahlem

(10) Patent No.: US 10,684,393 B1
(45) Date of Patent: Jun. 16, 2020

(54) RAIN GAUGE

(71) Applicant: Donald Sahlem, Akron, NY (US)

(72) Inventor: Donald Sahlem, Akron, NY (US)

( * ) Notice: Subject to any disclaimer, the term of this patent is extended or adjusted under 35 U.S.C. 154(b) by 341 days.

(21) Appl. No.: 15/664,264

(22) Filed: Jul. 31, 2017

Related U.S. Application Data

(60) Provisional application No. 62/494,367, filed on Aug. 5, 2016.

(51) Int. Cl.
*G01W 1/14* (2006.01)

(52) U.S. Cl.
CPC .................. *G01W 1/14* (2013.01)

(58) Field of Classification Search
CPC ...................................................... G01W 1/14
USPC ..... 73/170.17–170.23, 290 R, 290 B, 290 V, 73/291–334; 340/618–625
See application file for complete search history.

(56) References Cited

U.S. PATENT DOCUMENTS

| | | | | |
|---|---|---|---|---|
| 3,567,259 A | * | 3/1971 | Benson et al. | F16L 47/22 264/230 |
| 4,106,336 A | * | 8/1978 | Marley | G01W 1/14 73/170.17 |
| 2009/0174180 A1 | * | 7/2009 | Lackey | C09J 5/00 285/21.3 |
| 2010/0011854 A1 | * | 1/2010 | De Sanzo | G01F 23/0007 73/323 |
| 2013/0047718 A1 | * | 2/2013 | Chae | G01W 1/14 73/170.23 |
| 2013/0113205 A1 | * | 5/2013 | Berardi | F16L 11/10 285/123.1 |
| 2016/0033048 A1 | * | 2/2016 | Noah | F16K 11/0525 137/544 |

FOREIGN PATENT DOCUMENTS

| | | | |
|---|---|---|---|
| CN | 201455 | * | 5/2014 |
| FR | 002325056 | * | 4/1977 |

* cited by examiner

*Primary Examiner* — Robert R Raevis

(57) ABSTRACT

A rain gauge that allows freezing and thawing of rain or ice without damage is described. The rain gauge is comprised of a vessel and an elastic insert. As the rain inside the gauge freezes, the elastic insert compresses, displacing the increased volume of the ice. When the ice melts, the compression of the elastic insert reverses, thus leaving the device unharmed.

5 Claims, 4 Drawing Sheets

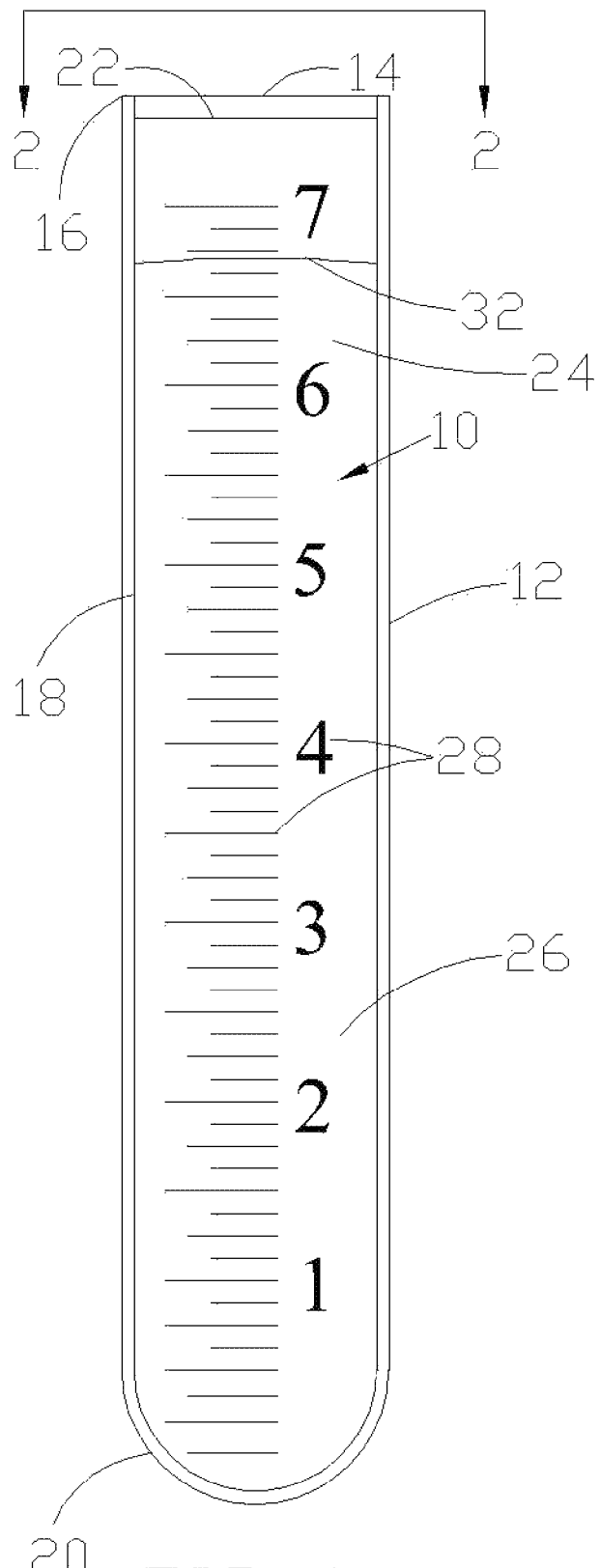
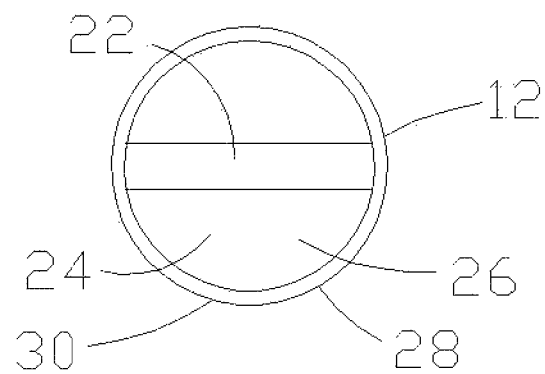
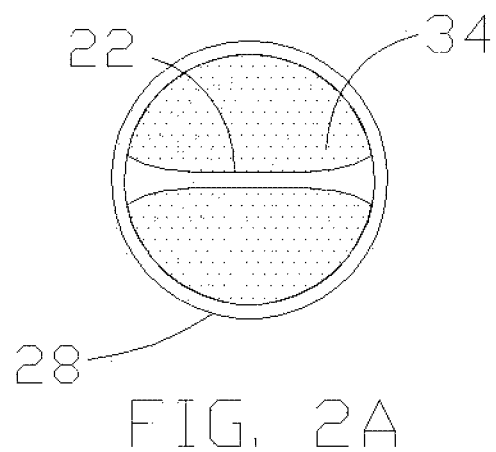

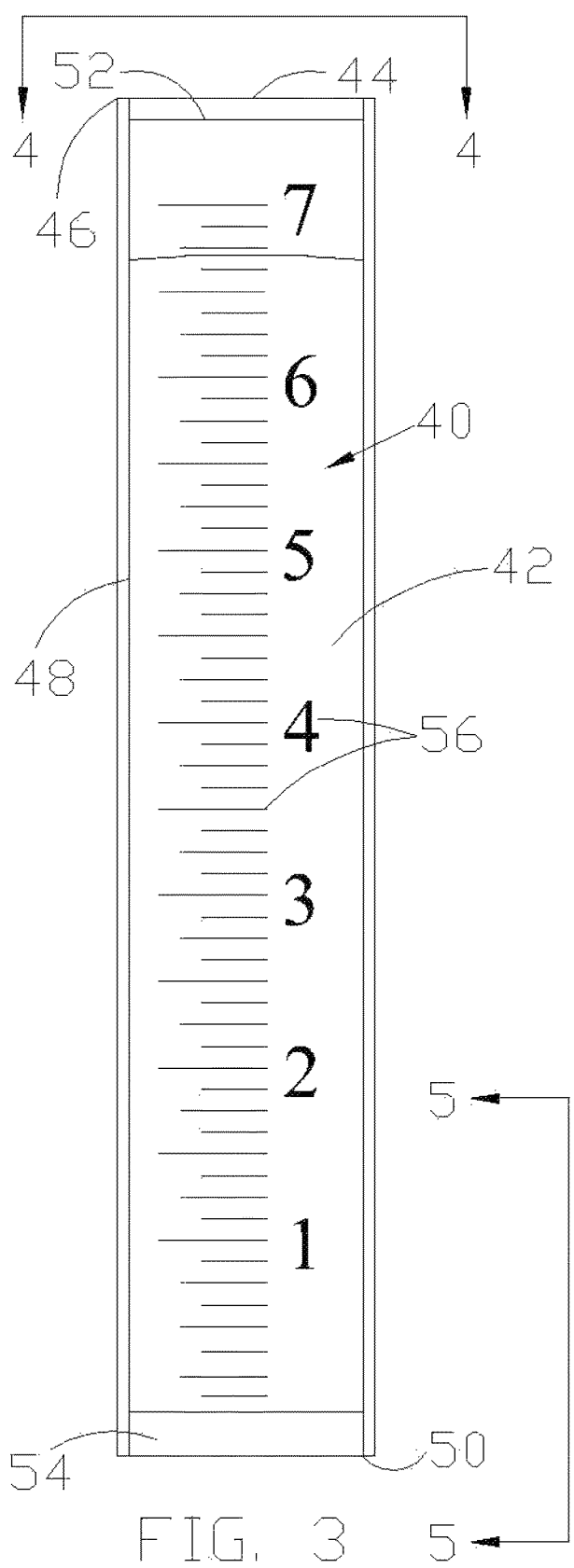
FIG. 3
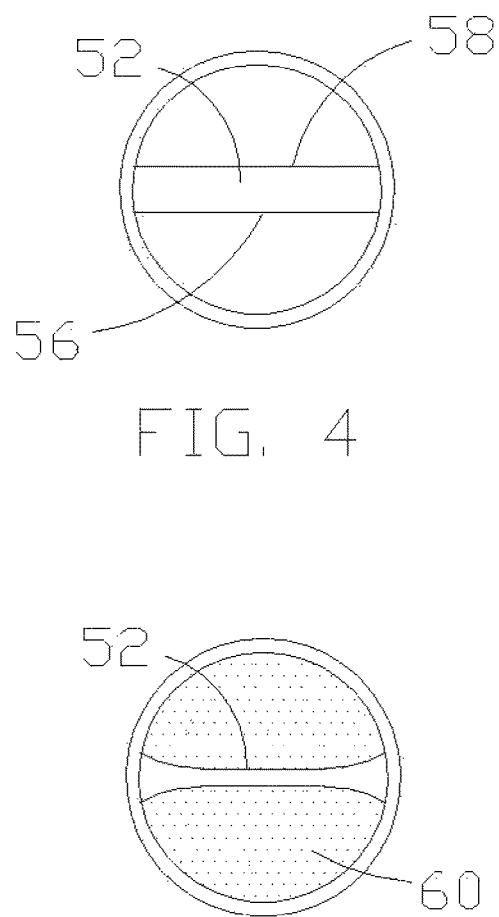
FIG. 4
FIG. 4A
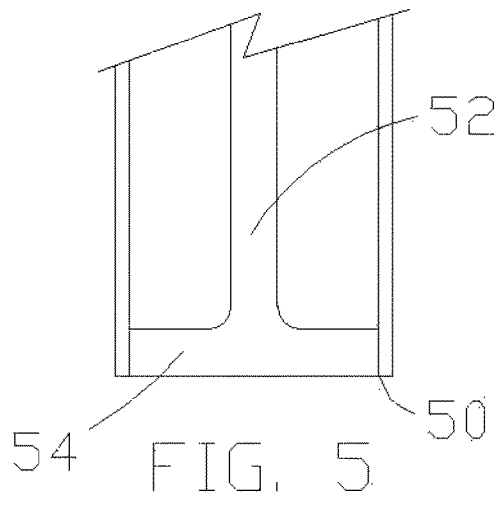
FIG. 5

RAIN GAUGE

CROSS-REFERENCE TO RELATED APPLICATIONS

This application claims the benefit of PPA 62/494,367 dated Aug. 5, 2016.

BACKGROUND OF THE INVENTION

1. Field of Invention

The present invention relates to devices for measuring rainfall. These devices capture rain in a transparent tubular vessel, such that the depth of local rainfall can be determined by comparing the rain level in the vessel to reference marks on the gauge. Usually the vessel is made of glass or plastic. One potential problem with such devices is that if the rain inside the vessel freezes, the expansion strains the vessel which can rupture and ruin the device. A rain gauge that can withstand the contained rain freezing without breakage is described herein.

2. Prior Art

Previously, rain gauges have been made resistant to freezing by way of depositing chemicals into them to prevent rain contents from freezing. Also, gauges have been described as being made from freeze-proof plastic. Since rain gauges are used outdoors, sun radiation and temperature changes tend to breakdown plastic over time, assuming that the plastic had enough elasticity in the first place. None of the methods to this point describe a convenient solution that performs well and has longevity.

Objects and Advantages

The objects and advantages of the present invention are:
(a) To provide a rain gauge that can withstand repeated freezing and thawing of the contained rain without harm.
(b) To provide a rain gauge that can withstand repeated freezing and thawing of the contained rain without additional chemicals.
(c) To provide a rain gauge where the vessel portion is made of glass and can withstand repeated freezing and thawing of the contained rain without harm.

Further objects and advantages of my invention will become apparent from a consideration of the drawings and the ensuing description.

SUMMARY OF THE INVENTION

The present invention, a rain gauge, is directed to a device that can withstand freezing and thawing of contained rain without damage to the gauge.

BRIEF DESCRIPTION OF THE DRAWINGS

FIG. 1 is a front view of the rain gauge.
FIG. 2 is a top view of the rain gauge, showing an end view of the vessel and elastic insert.
FIG. 2A is a top view of the rain gauge, showing an end view of the vessel and elastic insert after the contained rain is frozen.
FIG. 3 is a front view of the rain gauge, showing an alternate embodiment.
FIG. 4 is a top view of the rain gauge of FIG. 3, showing an end view of the vessel and elastic insert.
FIG. 4A is a top view of the rain gauge of FIG. 3, showing an end view of the vessel and elastic insert, after the contained rain is frozen.
FIG. 5 is a side view of the elastic insert with integral bottom of the rain gauge of FIG. 3.

DETAILED DESCRIPTION

Figure 6:
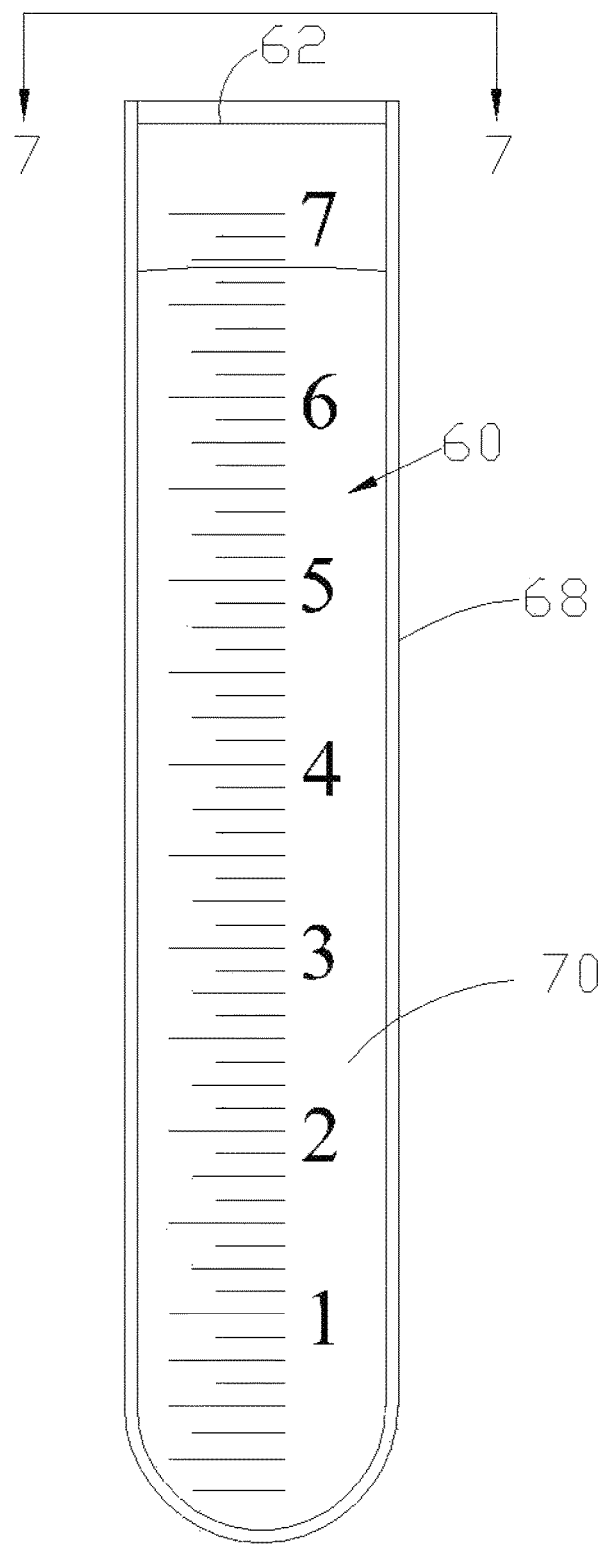
FIG. 6 is a front view of the rain gauge, showing a second alternate embodiment.

This invention relates to a device for measuring rainfall while enduring freezing and thawing without damage. The invention can be configured into a number of embodiments, several of which are described as follows; FIGS. 1, 2, and 2A show the invention 10 in an embodiment where the first component is a transparent open topped vessel 12. The vessel 12 has an opening 14 at the top 16, a hollow vertical portion 18 and a bottom 20. The bottom 20 is fully closed in order to contain rain 24 which enters by way of the open top 14, 16. As shown in FIGS. 1 and 2, an elastic insert 22, fits inside the vessel 12, runs essentially the full height of the tube 12, so as to be contacted by any rain 24 contained in the vessel 12. The elastic insert 22 is held in place mechanically by an interference fit where the elastic insert 22 is slightly compressed as it is inserted into the vessel 12. While this embodiment shows an interference fit, the vessel 12 and elastic insert 22 can be held in position by any number of means. A few additional examples are by adhesive means, or by gravity.

In operation, rain 24 enters the tube 12 at the opening 14, is contained on the inside portion 26 of the vessel 12, and settles at a level 32. Markings 28 on the side 30 of the vessel 12 allow for reading the level 32 of the contained rain 24. When the gauge 10 is exposed to subfreezing temperatures, the rain 24 contained inside the gauge 10 freezes. When rain water changes phase to ice, it expands approximately 9% by volume. As shown in FIG. 2A, the expansion caused by the frozen rain 34 is displaced by the compression of the elastic insert 22, thus limiting the pressure inside the vessel 12 to that that is required to compress the elastic insert 22. This compression of the relatively weak elastic insert 22 limits deformation of the vessel 12 thus preventing rupturing. When the contents of the gauge 12 warm up and melt, the elastic insert 22 returns to its original size and shape as shown in FIG. 2.

The next embodiment of the invention is shown in FIGS. 3, 4, 4A and 5. In this embodiment of the invention 40, the vessel 42 has an opening 44 at the top 46, a hollow vertical portion 48 and an open bottom 50. As shown in FIG. 5, the elastic insert 52 has an integral bottom portion 54, which is sealed to the bottom end 50 of the vessel 42. This embodiment functions the same as the one shown in FIGS. 1-2A, where frozen rain 60 (see FIG. 4A) compresses the elastic insert 52.

FIG. 4 shows another embodiment of the invention where the markings 56 are applied to the elastic insert 52. In this embodiment, markings in English units could be applied to one side 56 of the elastic insert 52 and metric units could be applied to the opposite side 58 of the insert 52, allowing the user to select the desired units.

Figure 7:
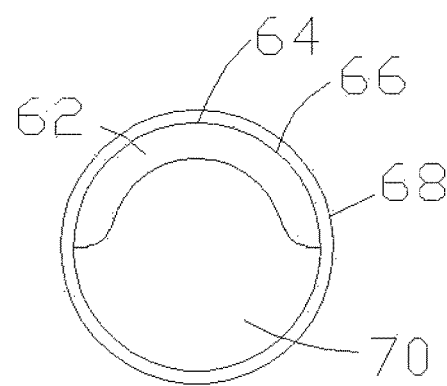
FIG. 7 is a top view of the rain gauge of FIG. 6, showing an end view of the vessel and elastic insert.
Figure 7A:
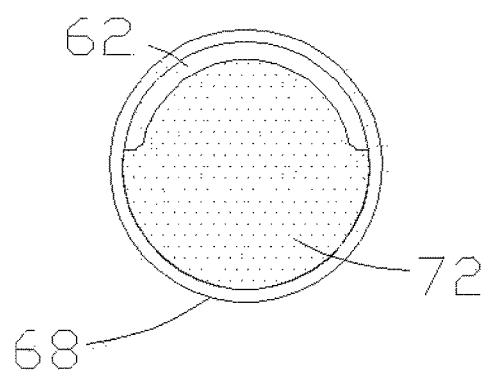
FIG. 7A is a top view of the rain gauge of FIG. 6, showing an end view of the vessel and elastic insert, after the contained rain is frozen.

FIGS. 6, 7 and 7A show an alternate embodiment of the invention 60 where the elastic insert 62 is C-shaped with an outer radius 64 matching up to and attached to the inside 66 of the vessel 68. In this embodiment, FIG. 7 shows the insert 62 and contained rain 70. FIG. 7A shows the vessel 68 with the elastic insert 62 compressed by frozen rain 72.

Figure 8:
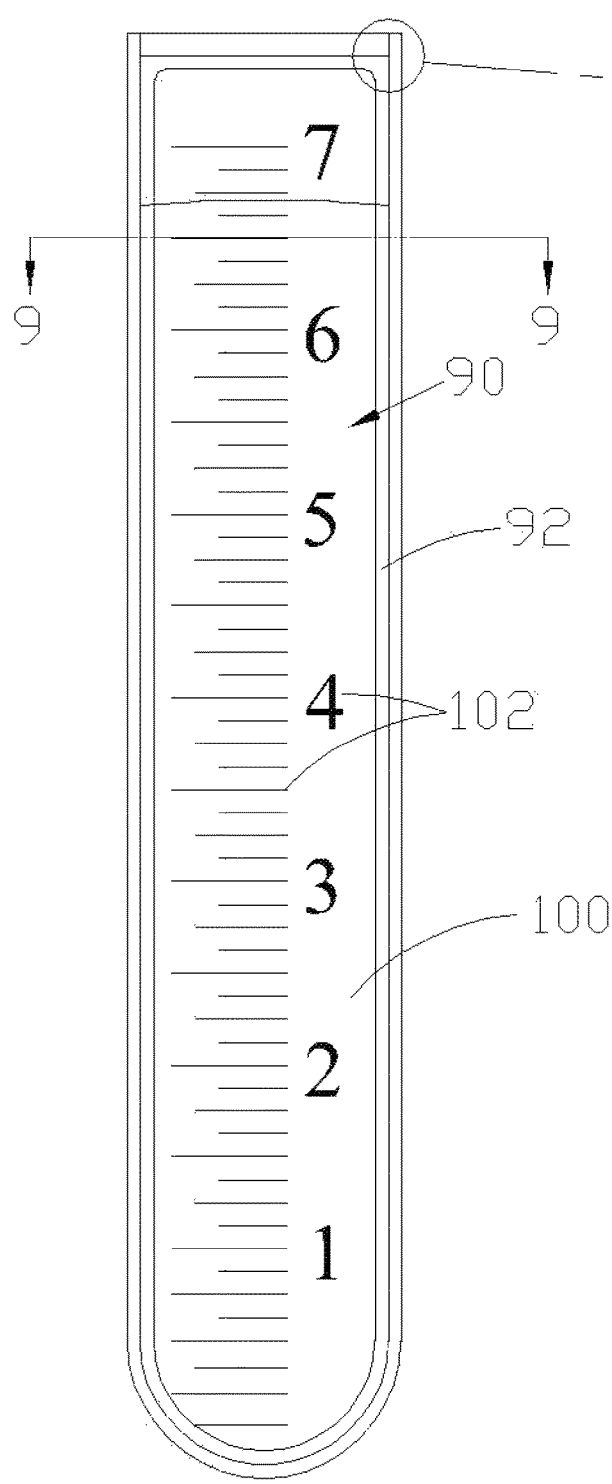
FIG. 8 is a front view of the rain gauge, showing a third alternate embodiment.
Figure 9:
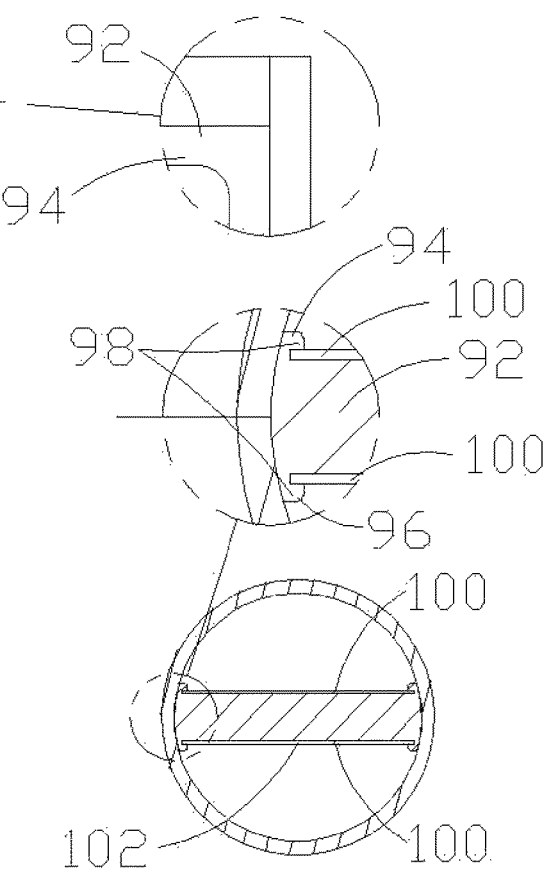
FIG. 9 is a top view of the rain gauge of FIG. 8, showing an end view of the vessel, elastic insert, and restrained dials.
Figure 9A:
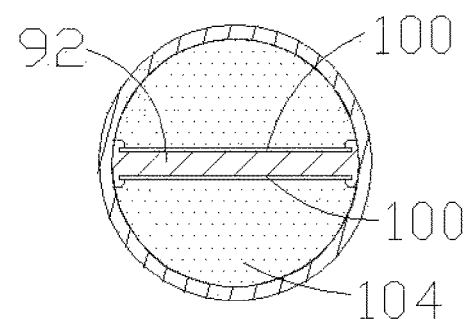
FIG. 9A is a top view of the rain gauge of FIG. 8, showing an end view of the vessel, elastic insert, and restrained dials after the contained rain is frozen.

FIGS. 8, 9 and 9A show an embodiment of the invention 90 with an alternative structure to the elastic insert 92. Referring to FIG. 9, the elastic insert 92 has a lip 94 on one 96 or both 98 sides of it to facilitate the retention of one or more gauge dials 100. These dials 100 can be of a visually appealing material, such as stainless steel, and provide a location for height reference marks 102 as well as other graphic elements such as ornamentation or advertising. FIG. 9A shows the elastic insert 92 compressed by frozen rain 104.

CONCLUSION, RAMIFICATIONS AND SCOPE

This invention provides an effective method for measuring rainfall while at the same time being capable of withstanding freezing and thawing of the contained rain without damage. While the description above contains many details, these should not be construed as limiting the scope of the invention, but as examples of embodiments of the invention. Accordingly, the scope of the invention should be determined by the claims, not the specifics of the embodiments.

What I claim is:

1. A rain gauge comprising:
a) a vessel;
b) an elastic insert that extends essentially along the entire height of the vessel;
said elastic insert positioned inside of said vessel so that when rain contained in said vessel freezes said elastic insert compresses limiting deformation of said vessel, wherein either said vessel or elastic insert has incremental markings for determining depth of rain.

2. A rain gauge, as recited in claim 1, wherein said vessel and said elastic insert are mechanically attached.

3. A rain gauge, as recited in claim 1, wherein said vessel and said elastic insert are attached by adhesive.

4. A rain gauge, as recited in claim 1, wherein said vessel and said elastic insert are held in position by gravity.

5. A rain gauge comprising:
a) a vessel;
b) an elastic insert that extends essentially along the entire height of the vessel;
said elastic insert positioned inside of said vessel so that when rain contained in said vessel freezes said elastic insert compresses limiting deformation of said vessel, wherein at least one gauge dial having incremental markings is contacting the elastic insert for determining depth of rain.

* * * * *